United States Patent [19]
Norton

[11] Patent Number: 5,822,959
[45] Date of Patent: Oct. 20, 1998

[54] PICK-UP FOR HARVESTING A LYING CROP

[76] Inventor: R. Scott Norton, Box 23, Rocanville, Saskatchewan, Canada, S0A 3L0

[21] Appl. No.: 643,758

[22] Filed: May 6, 1996

[51] Int. Cl.$^6$ ............................. A01D 57/04; A01D 89/00
[52] U.S. Cl. ...................................... 56/1; 56/364
[58] Field of Search ................................. 56/1, 11.2, 208, 56/209, 327.1, 364, DIG. 1, DIG. 15, 270, 212, 126, 119, 14.1, 14.2, 14.4

[56] References Cited

U.S. PATENT DOCUMENTS

| | | | |
|---|---|---|---|
| 3,386,235 | 6/1968 | Van der Lely | 56/210 |
| 3,815,344 | 6/1974 | Kucera | 56/1 X |
| 4,040,344 | 8/1977 | Moore et al. | 56/1 X |
| 4,171,606 | 10/1979 | Ziegler et al. | 56/364 X |
| 4,304,089 | 12/1981 | Mescheryakov et al. | 56/364 |
| 4,304,090 | 12/1981 | Gavrilenko et al. | 56/364 |
| 4,365,463 | 12/1982 | Bettencourt et al. | 56/327.1 |
| 4,463,546 | 8/1984 | Day | 56/364 |
| 4,965,993 | 10/1990 | Butler et al. | 56/327.1 |
| 5,090,187 | 2/1992 | Mews | 56/364 |

FOREIGN PATENT DOCUMENTS

21968/88  9/1987  Australia .

*Primary Examiner*—Michael J. Carone
*Assistant Examiner*—Robert Pezzuto
*Attorney, Agent, or Firm*—Adrian D. Battison; Murray E. Thrift

[57] ABSTRACT

A header attachment for mounting on the straight cut header of a combine includes a guide plate which engages over the knife of the straight cut header with arms extend underneath the header so as to hold the header attachment in fixed position on the header frame. At the front of the guide plate is mounted a pair of pick-ups which are inclined slightly rearwardly and outwardly and each is independently pivotal on the guide plate so that each end of each pick-up can be raised and lowered to follow ground contour. A coulter is mounted in front of each end of each pick-up so as to be responsive to ground level while cutting the lying crop. Each pick-up includes a series of belts arranged edge to edge and held in abutting position by ribs on the inside surface of the belts which cooperate with the corresponding grooves in the outside surface of the guide rollers. The header is used to convert a straight cut header for harvesting lying crops such as peas.

22 Claims, 5 Drawing Sheets

PICK-UP FOR HARVESTING A LYING CROP

BACKGROUND OF THE INVENTION

This invention relates to a pick-up for harvesting a lying crop. The pick-up shown and described herein is designed particularly but not exclusively for use with the straight cut header of a combine so as to be mounted on the front of the combine on top of the straight cut header to act in lifting a lying crop such as peas onto the header for threshing within the combine harvester.

In Australian patent application 21968/88 filed by Ruwoldt et al is disclosed a pick-up device which can be attached to the front of a straight cut header of a combine. This device comprises a guide surface with a rotating shaft underneath the guide surface and a plurality of fingers projecting through the guide surface and rotatable with the shaft such that crop can be lifted from the ground by the fingers and carried over the guide surface of the header of the combine.

However this device is generally unsatisfactory and has achieved little success since the techniques for lifting the crop from the ground are relatively ineffective. Furthermore the device is necessarily of narrow width in view of the rigid construction.

SUMMARY OF THE INVENTION

It is one object of the present invention, therefore, to provide an improved pickup for harvesting a lying crop.

According to one aspect of the invention there is provided a pick-up for harvesting a crop lying on the ground comprising: a pick-up frame; mounting means for mounting the frame for movement across the ground to be harvested with a width of the frame transverse to the direction of movement; at least two pick-up elements mounted on the frame in side to side arrangement with each of the elements extending across a part only of the width of the frame; each pick-up element having a front edge for engaging and lifting the lying crop onto the element and a rear edge for depositing the crop onto a collection surface on the frame for collection of the crop; and means mounting each of the pick-up elements on the frame for individual pivotal movement about an axis across the width of the frame such that a height of each element from the ground can be varied relative to the other of the elements.

According to a second aspect of the invention there is provided a pick-up for harvesting a crop lying on the ground comprising: a straight cut header having a header frame, mounting means for mounting the header frame for movement across the ground to be harvested with a width of the header frame transverse to the direction of movement, a sickle knife across a front edge of the header frame for cutting a standing crop and a header table for receiving the cut crop; a pick-up frame arranged for mounting on a front of the header frame wherein the pick-up frame includes a channel therein for receiving the sickle knife and a plurality of support arms for extending under the header table; at least one pick-up element mounted on the frame so as to extend across at least a part of the width of the frame; the pick-up element having a front edge for engaging and lifting the lying crop onto the element and a rear edge for depositing the crop onto a collection surface on the frame for collection of the crop; and means mounting the pick-up elements on the pick-up frame for pivotal movement about an axis across the width of the frame such that a height of the element from the ground can be varied relative to the header frame.

According to a third aspect of the invention there is provided a pick-up for harvesting a crop lying on the ground comprising: a pick-up frame; mounting means for mounting the frame for movement across the ground to be harvested with a width of the frame transverse to the direction of movement; at least one pick-up element mounted on the frame; said at least one pick-up element having a front edge for engaging and lifting the lying crop onto the element and a rear edge for depositing the crop onto a collection surface on the frame for collection of the crop; said at least one pick-up element including a front roller and a rear roller parallel to the front roller and a plurality of endless belts wrapped around the rollers and arranged in side edge to side edge relationship along the length of the rollers; and means for maintaining two of the belts in side edge to side edge relationship comprising a raised rib on an underside of each of the two belts adjacent a respective side edge thereof and at least one groove in each of the rollers arranged to receive and locate the ribs of said two of the belts at positions such that the side edges of the belts are maintained by the ribs in substantially abutting relationship.

According to a fourth aspect of the invention there is provided a pick-up for harvesting a crop lying on the ground comprising: a pick-up frame; mounting means for mounting the frame for movement across the ground to be harvested with a width of the frame transverse to the direction of movement; at least one pick-up element mounted on the frame; said at least one pick-up element having a front edge for engaging and lifting the lying crop onto the element and a rear edge for depositing the crop onto a collection surface on the frame for collection of the crop; said at least one pick-up element including two end frames, a front roller and a rear roller parallel to the front roller and generally at right angles to the end frames; each roller having bearing supports at opposed ends thereof for mounting the roller on the end frames for rotation about a longitudinal axis thereof; a plurality of endless belts wrapped around the rollers and arranged in side to side relationship along the length of the rollers including end belts and at least one intermediate belt; and spring biasing means for applying outward pressure on the rollers at a position thereon between the ends to tend to maintain the rollers parallel to reduce slipping of said at least one intermediate belt.

One embodiment of the invention will now be described in conjunction with the accompanying drawings in which:

BRIEF DESCRIPTION OF THE DRAWINGS

In the drawings like characters of reference indicate corresponding parts in the different figures.

DETAILED DESCRIPTION

In the figures is shown a conventional combine harvester 10 including a harvester body 11 mounted on ground wheels 12. At the front of the body 11 is mounted a feeder housing 13 which is carried at the front of the combine harvester body and can be pivoted upwardly and downwardly for supporting and moving a straight cut header 14 carried on the feeder housing.

The straight cut header includes a frame 15 including a main beam 16 extending across the full width of the header. The frame further includes a bottom beam 17 and a forwardly extending table 18 which carries at its forward end a knife bar 19 and a sickle knife 20. Between the main beam 16 and the bottom beam 17 is provided a rear plate 21 which has an opening at the entrance into the feeder housing 13 so as to allow crop material to pass into the feeder housing for transport through the feeder housing to the combine body.

The crop material is carried along the bottom plate 18 by an auger 22 having a flight 23 which is directed so that rotation of the tube of the auger carries the crop material inwardly as it is pushed underneath the auger tube to the feeder housing.

A conventional reel 24 is mounted on reel arms 25. The reel includes a series of bats 26 at spaced positions around a rotation axis 27 of the reel so as to sweep the crop material downwardly and rearwardly over the knife 20 to the table and the auger for collection.

The above combine and header is of course entirely conventional and the elements thereof are shown only schematically and described briefly as the details are well known to one skilled in the art.

On top of the header is mounted the harvester apparatus 30 of the present invention. This comprises a main elongate beam 31 extending across the full width of the header which forms a structural member for attachment to the header. On the underside of the beam 31 is mounted a pair of arms 32 which are attached to the beam and extend rearwardly therefrom underneath the bar 19 and the beam 17 of the header for engagement into a collar 33 attached underneath the beam 17. Each of the arms 32 thus extend through a respective one of the collars 33 and is attached thereto by a pin 34 which extends through the arm and prevents the retraction of the arm through the collar 33.

On top of the beam 31 is mounted a guide plate 35 over which the crop material can run for passage onto the table 18 of the header. Underneath the rear edge 36 of the guide plate and rearwardly of the beam 31 is mounted a channel member 37 with an upper leg 38 of the channel member attached to the rear edge 36 of the plate 35 so as to form therewith an extension of the guide surface. The channel member 37 includes further a bottom leg 39 which is located downwardly from the top leg 38 by a front web 40. The channel member thus defines a longitudinal receptacle extending across the full width of the header and receiving the knife 20 therein.

The harvester apparatus 30 is therefore rigidly mounted on the header by the engagement of the knife 20 into the channel which prevents upward and downward movement of the beam 31 and by engagement of the arms 32 into the sleeve 33 at the rear of the header.

On top of the guide plate 35 is mounted a pair of pick-ups 42 and 43. The pick-ups 42 and 43 are mounted end to end and are inclined slightly apart so as to form a V shape therebetween such that a front edge 44 of each of the pick-ups is inclined from a central apex 45 forwardly and outwardly to respective ends 46 and 47 of the pick-ups.

Each of the pick-ups comprises a pair of end frames 48 and 49 which are parallel and generally planar. Each end frame is pivotally mounted on the guide plate 35 in a device 50 which is mounted on the guide plate adjacent the forward edge thereof. Each device 50 includes a pair of upstanding side plates with a transverse pin 51 which engages through the respective end frame and thus defines a pivot axis 52 about which the respective pick-up can pivot relative to the forward edge of the guide plate 35. In view of the angle between the pick-ups, the clevices 50 of the inner end frames 49 are mounted at a position further to the rear of the front edge 53 of the guide plate 35.

Each end frame comprises a vertical plate 54 facing toward the respective pick-up with a flange 55 extending around the plate and thus providing stiffness for the plate and defining a receptacle for elements mounted on the plate. The plate 54 includes a straight bottom edge 56 extending towards the front nose 57 and toward a rear end 58 at which the clevice 50 is located. The plate 54 further includes an upper edge which is inclined upwardly and rearwardly from the nose 57 to an apex 59 and then is angled downwardly relative to the front portion 60 through a rear portion 61 to the rear edge at the end 58.

The end frames 48 and 49 carry a pair of rollers 60 and 61 mounted adjacent the front 57 and rear 58 ends respectively. The rollers extend along the full length of the pick-up and are mounted in bearings 62 carried on the plate 54 for rotation about an axis longitudinal of the respective roller.

Figure 2:
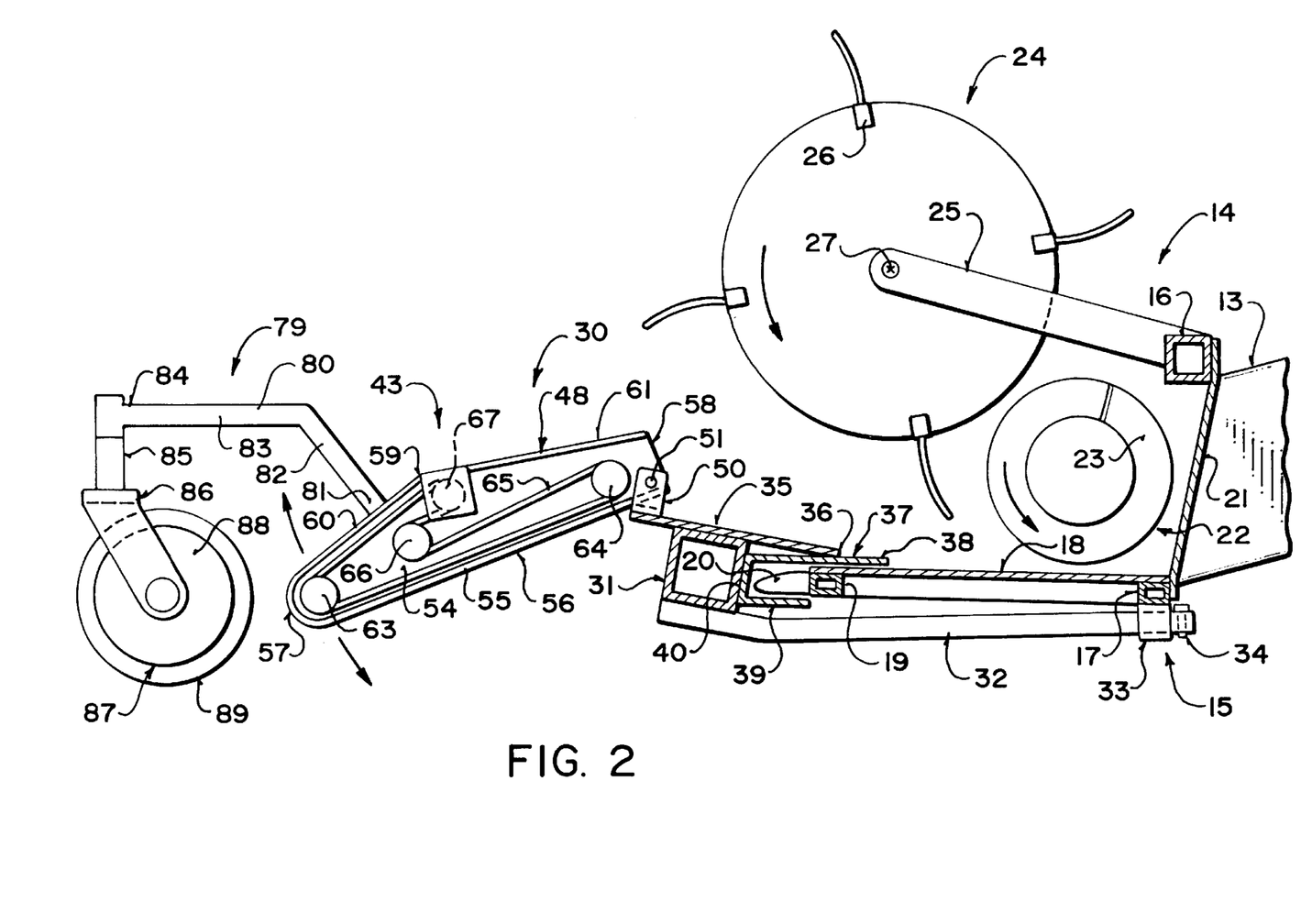
FIG. 2 is a side elevational view of the apparatus of FIG. 1 on an enlarged scale.

The rollers are driven from one end as best shown in FIG. 2 by sprockets 63 and 64 mounted on the rollers 60 and 61 respectively. The sprockets 63 and 64 are driven by a chain 65 which passes over an idler roller 66 to a sprocket (not shown) mounted on a hydraulic motor 67 carried on the end frame. A hydraulic motor is mounted adjacent the apex 59.

Figure 1:
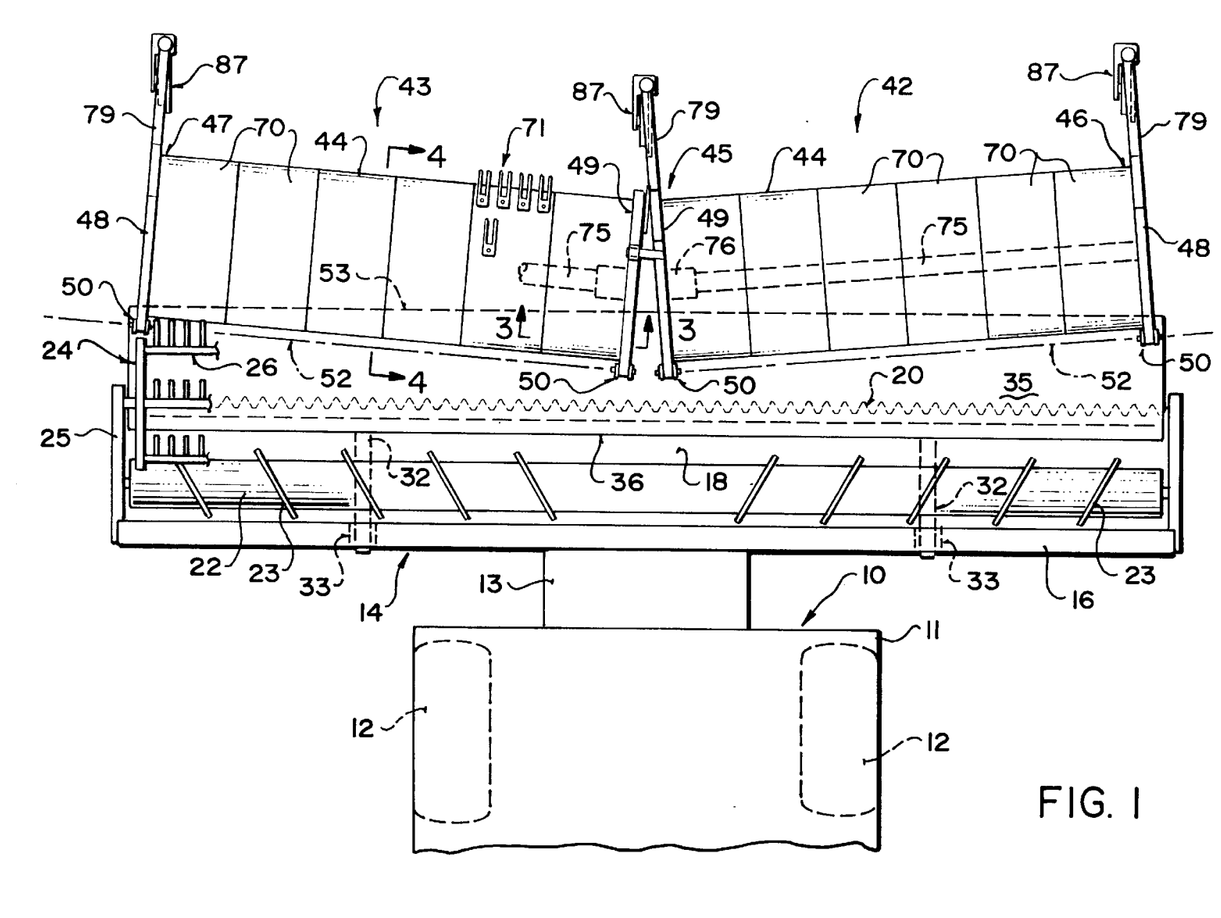
FIG. 1 is a top plan view of the header according to the present invention mounted on the straight cut header of a combine harvester.

The rollers 60 and 61 have wrapped around the rollers a plurality of individual drive belt members 70 which lie side by side along the length of the rollers. Thus each belt member is continuous and wrapped around the two rollers for rotation around the rollers as the rollers are driven. As shown in FIG. 1 there are six such belt members 70 mounted in side edge to side edge abutting relationship across the full width of the pick-up.

Each belt 70 is of a conventionally known construction including a plurality of fingers 71 arranged in spaced positions across the belt and at spaced positions longitudinally of the belt. In FIG. 1 only some of the fingers are shown on one of the belt members for convenience of illustration. The finger members are of a conventional construction and include a pair of such fingers projecting forwardly and outwardly from the belt with the fingers connected at a base of the fingers and riveted to the outer surface of the belt to be carried thereby.

Figure 3:
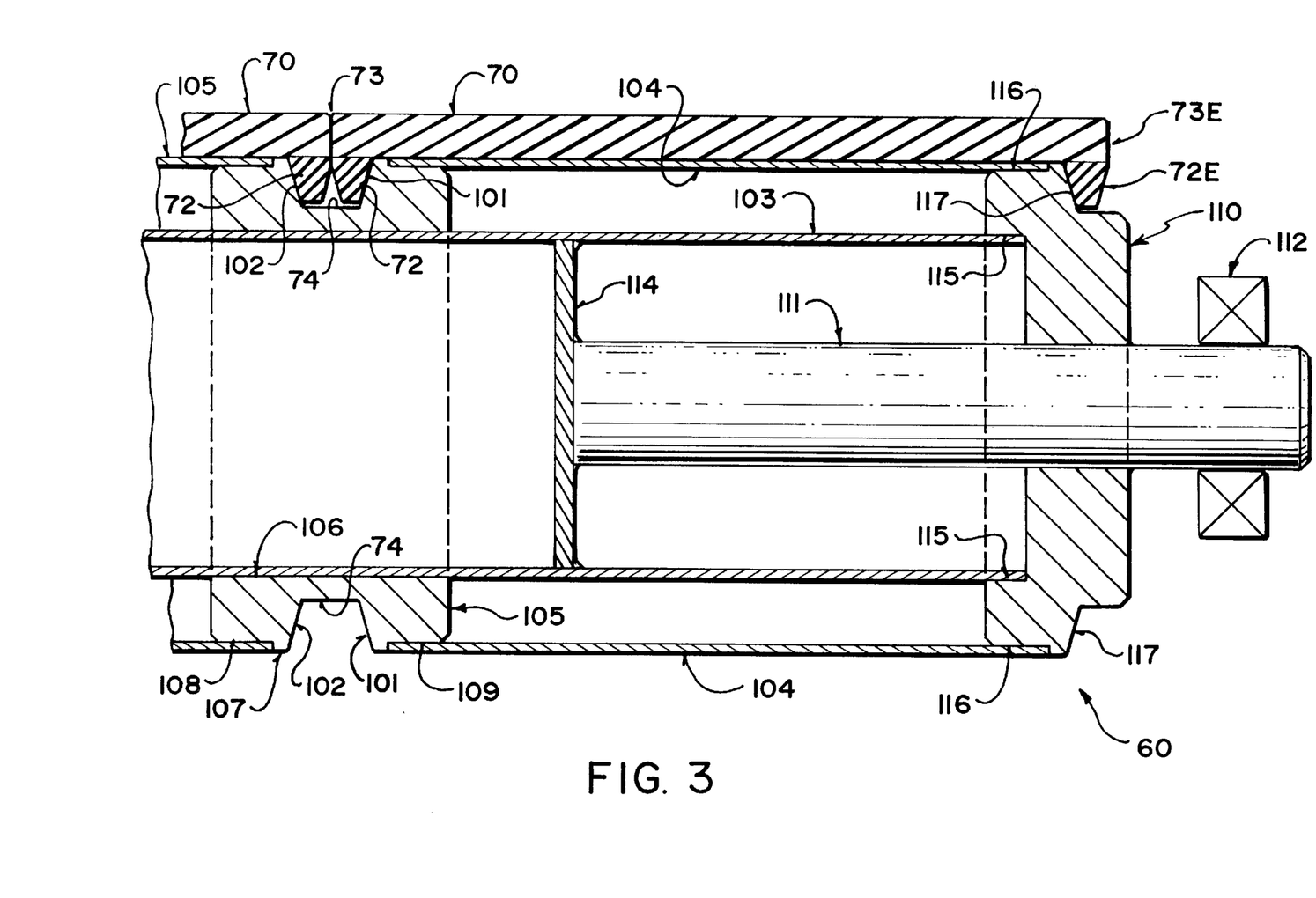
FIG. 3 is a cross-sectional view along the lines 3—3 of FIG. 1.
Figure 4:
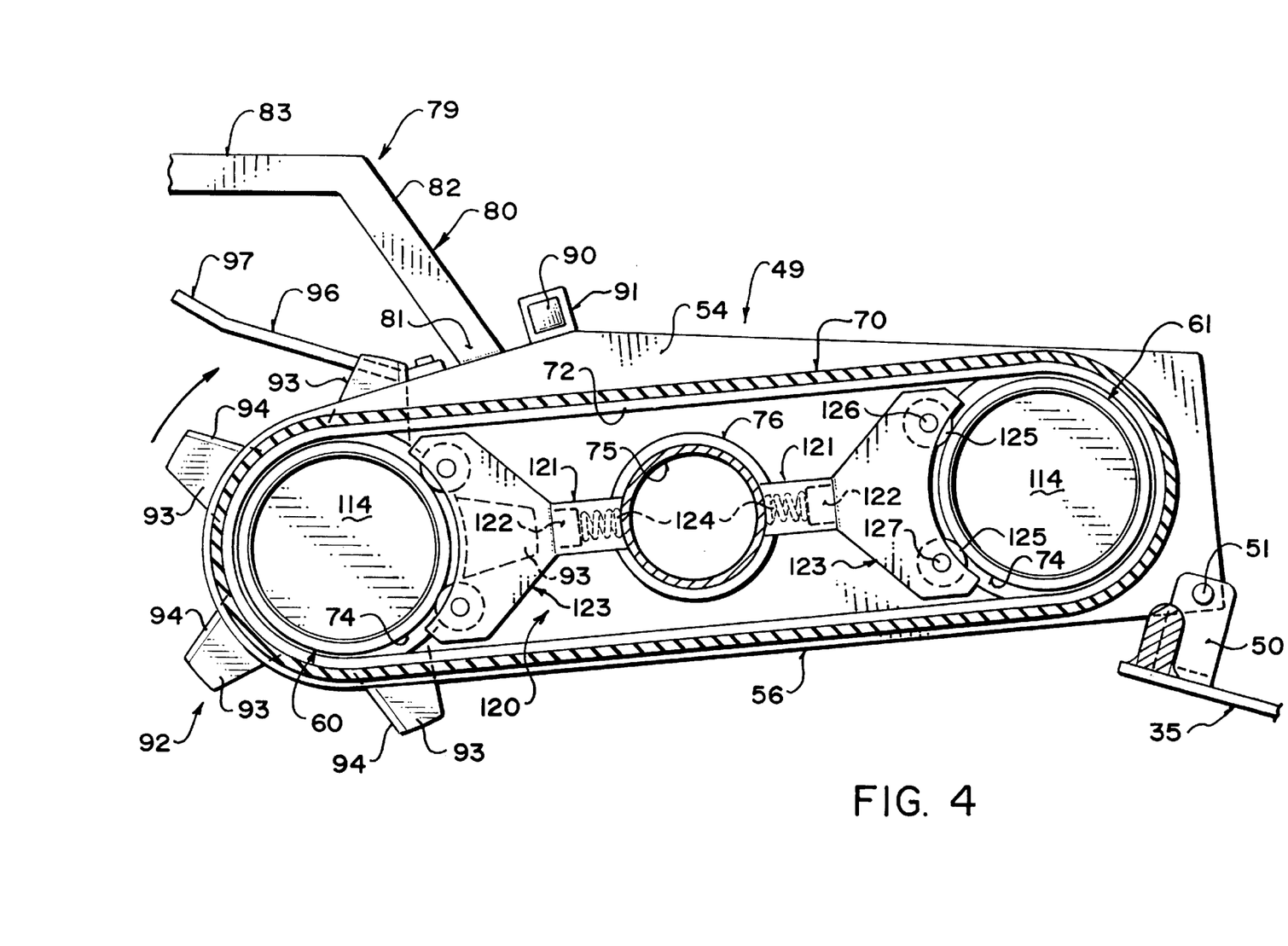
FIG. 4 is a cross-sectional view along the lines 4—4 of FIG. 1.
Figure 5:
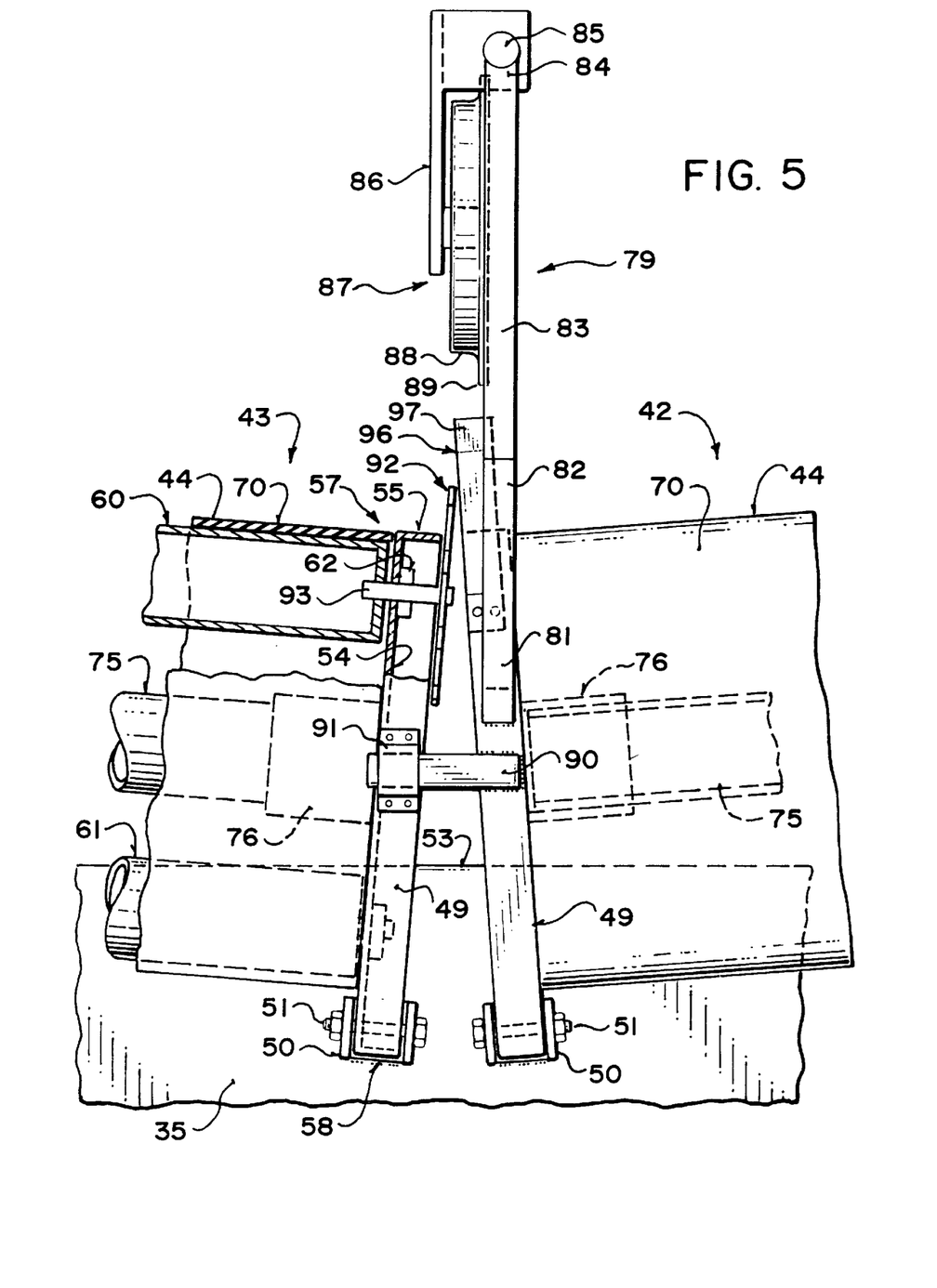
FIG. 5 is a top plan view on an enlarged scale of the centre section only of the header.

Turning now to FIG. 3, each belt 70 has on its underside a V-shaped rib 72 arranged immediately adjacent one side edge 73 of the belt. The ribs 72 extend downwardly from the underside of the belt with the rib having a wider base and converging downwardly and inwardly to a narrower apex which is parallel to the underside of the belt. Thus each belt has two side edges 73 and at each side edge a respective one of a pair of such ribs. The ribs are continuous along the full length of the belt.

Each roller 60, 61 is formed with a plurality of grooves 74 each for receiving a adjacent ones of the ribs 72. The grooves 74 are located along the length of the roller so as to receive, as best shown in FIG. 3, the ribs of abutting pairs of belts closely adjacent the abutting edges 73. The ribs thus hold and locate the belts in fixed position relative to the rollers to prevent longitudinal movement of the belts along the rollers. The belts are thus held in side to side abutting relationship without any space between the belts. The axial location of the belts provided by the ribs and grooves thus prevents any spaces from being generated between the belts so that the belts are continuously in contact. In this way crop material is prevented from being pinched between the belts which would otherwise prevents its release as the crop material is carried over the upper run of the belt from the nose 57 onto the guide plate 35.

The grooves 74 are thus arranged to be twice the width of the ribs 72 so that both ribs are received within the single groove. The grooves include side walls 101 and 102 which converge inwardly and downwardly to a base with the angle of convergence equal to the angle of convergence of the side walls of the ribs. Thus the ribs are tightly held within the groove so that the edges 73 of the belt are held in abutting relationship.

It is also possible that the ribs can be located on the belts at a position spaced slightly inwardly from the edge 73, in which case the groove 74 may be divided into two separate grooves each for receiving respective one of the ribs. However it is more convenient to provide the ribs directly at the edge since this properly locates the ribs and thus avoids problems with tolerances. The ribs are formed by conventional V belts which are vulcanized onto the underside of the belt in formation of the belt.

The roller 60 is formed from a continuous inner tube 103 which extends along the full length of the roller. The roller is also formed from a plurality of outer tube portions 104, 105 which surround the inner tube 103 and are co-axial thereto. In between the outer tube portions is located a plurality of collars 105 on which the grooves 74 are formed. The collars have an inner surface 106 attached to an outer surface of the inner tube 103. The collar is defined by a cylindrical body having an outer surface 107 in which the groove 74 is formed. Ends of the surface 107 include shoulders 108 and 109 on which is received a respective one of the ends of the outer tube portion. The depth of the shoulder is arranged so that the outer tube portion has an outer surface which is contiguous with the outer surface 107 of the respective collar.

It will of course be appreciated that a respective one of the collars is provided at each intersection between two belt portions so that each outer tube portion has a length approximately equal to the width of the respective belt. At the end of the tube is provided an end member 110 in the form generally of a disc through which a shaft 111 passes co-axial with the roller with the shaft defining a mounting for bearings 112 attached to the respective end frame of the pick-up. The shaft extends through the end member 110 to a stiffening plate 114 attached to the end of the shaft and extending therefrom to the inside surface of the inner tube 103.

The end member 110 defines a first inner surface 115 for receiving an end portion of the inner tube 103. Co-axially surrounding the surface 115 is provided a second surface 116 which receives an end portion of the outer tube portion 104. The surface 116 thus provides a shoulder similar to the shoulders 108 and 109. Outwardly of the shoulder 116 is provided an abutment surface 117 which is inclined so as to receive a side wall of the end rib 72E of the endmost belt so as to locate the edge 73E of the endmost belt.

The roller thus forms in effect a truss structure defined by the inner tube 103, the outer tube portions 104, the collars 105 and the end member 110. This roller structure is therefore very stiff for its weight since it can use relative thin tubing for the inner and outer tubes. In addition the machining necessary to form the grooves is carried out in the collars and end members which are relatively small items and hence can be machined readily prior to assembly into the completed roller.

The end frames 48 and 49 are individually pivotal about the respective device 50. Thus each of the end plates can be lifted vertically while the other end frame remains at a constant height. This allows the two pickups to closely follow the ground contour since the inner ends of the pickups can rise and fall relative to the outer ends and vice versa.

The end frames are interconnected by a longitudinal tube forming a structural member and indicated at 75. The tube has one end attached to one of the end frames and its opposed end received in a collar 76 attached to the other of the end frames. Thus the tube is fixed at one end to the end frame but can rotate relative to the end frame at the collar 76. This allows the pivotal movement of the end frames relative to one another while maintaining the end frame in structural interconnection to maintain the stability of the pickup structure. In order to allow the rotation of the tube relative to the collar, both are of circular cross section with the tube being a sliding fit inside the collar.

The center tube 75 also provides support for a spring biasing assembly 120 which acts to bias the rollers 60 and 61 outwardly that is in a direction apart from one another at a position intermediate the two ends of the rollers. The spring biasing assembly 120 comprises a pair of collars 121 which are mounted on the center tube and face outwardly towards respective ones of the rollers. Each collar receives a stub shaft 122 of a wheel assembly 123. A spring 124 at the bottom of the collar 121 spring biases the stub shaft 122 toward the respective roller. The wheel assembly 123 carries a pair of wheels 125 and 126 mounted on pins 127 carried on the wheel assembly. The wheel 125 is thus positioned below the stub shaft 122 and the wheel 126 is positioned above the stub shaft 122 so that the force on the stub shaft is applied between the two wheels. The wheels are thus engaged onto the roller and are prevented from movement upwardly or downwardly relative to the roller by the geometry of the wheels relative to the line force. The wheels are prevented from moving side to side by shaping the wheels so that they fit within a respective one of the grooves 74 of the roller. As the wheels are positioned inside the area defined by the belt 70, the wheels run in the area of the roller which is free from the rib.

The force applied by the springs 124 therefore presses the wheels outwardly against the rollers so as to counteract any tendency of the rollers to bend and to maintain the rollers straight and parallel. This prevents the bending of the rollers from causing a reduction in the path length around the rollers which could otherwise allow the belts adjacent the center of the pick-up to slip as the rollers rotate.

The outer frame 48 of each of the pick-ups is supported on a coulter support frame 79 attached to the end frame and extending forwardly therefrom. Similarly the inner end frame 49 of the pickup 42 is mounted on a further coulter support frame 79 extending forwardly therefrom. Each coulter support frame comprises an arm 80 which is attached at its rearward end 81 to the upper face of the flange portion 60 of the end frame and extends therefrom upwardly and forwardly in a first portion 82 which is attached to a second portion 83 extending horizontally forwardly to a forward end 84. At the forward end is mounted a vertical post 85 which carries a castor mount 86 rotatable about a vertical axis of the post 85. The castor mount carries a coulter wheel 87 of conventional construction with a main disc portion 88 and a sharp edge portion 89 extending radially outwardly from the disc portion so as to cut slightly into the ground as the coulter rolls across the ground thus providing a cutting action on the crop lying on the ground.

The coulter support frame thus provides a height control for the forward nose 57 of the pick-up. In this way the height of the forward end of the pickup is raised and lowered in dependence upon the height of the ground as measured by the edge 89 of the coulter disc.

The center parts of the pick-ups 42 and 43 are controlled in height by the single central coulter support frame 79 together with an interconnecting bar 90 which extends from the end frame 49 of the pick-up 42 to a sleeve 91 on the end frame of the pick-up 43. Thus the central end frames 49 are maintained at a common height which can vary in accordance with ground height and can vary relative to the outer ends of the pick-up frames.

In this way the pick-up frames can twist so that the ends are different heights while the header 14 remains at a common height.

Attached to the roller 60 of the pickup 43 is a cutting knife 92. Thus a shaft 93 of the roller 60 which extends through the bearings 62 extends to the outside face of the end frame 49 with that shaft carrying the knife 92 for rotation with the roller about the axis of the shaft. The knife 92 comprises a plurality of individual blades 93 at spaced positions around the axis of rotation with each blade being sharpened at a forward edge 94 extending generally radially outwardly from the axis so that the sharpened forward edge is carried around in a cutting action against the edge of the flange of the end frame. The knife is thus planar and lies in the plane of the end of the flange 55. A guide 96 is mounted on the inner end frame 49 of the pickup 42 and defines a plate which extends forwardly with an upturned nose 97 so that the crop passing over the forward edge of the pick-ups is pushed downwardly under the guide plate 96 to engage into the area of the knife 92. In this way the crop material which moves rearwardly relative to the header as the header is moved forwardly is divided firstly by the central coulter disc in two separate sections and then any remaining stocks are cut by the knife 92 so that the two separate portions can pass over the two separate pick-ups moving slightly outwardly as the crop material moves rearwardly so as to be carried over the belts and discharged onto the guide surface 35 for engagement into the transportation of the header 14.

I claim:

1. A pick-up for harvesting a crop lying on the ground comprising:

a pick-up frame;

mounting means for mounting the frame for movement across the ground to be harvested with a width of the frame transverse to the direction of movement;

at least two pick-up elements mounted on the frame in side to side arrangement with each of the elements extending across only a part of the width of the frame;

each pick-up element having a front edge for engaging and lifting the lying crop onto the element and a rear edge for depositing the crop onto a collection surface on the frame for collection of the crop;

and means mounting each of the pick-up elements on the frame for individual pivotal movement about an axis across the width of the frame such that a height of each element from the ground can be varied relative to the other of the elements;

said mounting means mounting the pick-up elements such that each has the front edge arranged at an angle relative to a line at right angles to the direction of movement so that the front edges converge at inner ends thereof to an apex between the pick-up elements which is rearward of outer ends of the front edges.

2. The pick-up according to claim 1 wherein each end of each pick-up element can be raised and lowered independently of the other end.

3. The pick-up according to claim 1 wherein:

each pick-up element includes two end frames, a front roller and a rear roller parallel to the front roller and generally at right angles to the end frames;

each roller has bearing supports at opposed ends thereof for mounting the roller on the end frames for rotation about a longitudinal axis thereof;

there is provided a plurality of endless belts wrapped around the rollers and arranged in side to side relationship along the length of the rollers including end belts and at least one intermediate belt;

and there is provided spring biasing means mounted between the rollers in a plane joining the axes of the rollers and arranged to apply a spring force in a direction at right angles to the axes of the rollers so as to provide outward pressure on the rollers at an intermediate position thereon between the ends to tend to increase a distance between the rollers at the intermediate position so as to maintain the rollers parallel to reduce slipping of said at least one intermediate belt.

4. The pick-up according to claim 3 wherein the spring biasing means includes for each of the front and rear rollers a pair of wheels angularly spaced relative to the respective roller for rolling on an outer roller surface of the respective roller and locating the respective roller therebetween.

5. The pick-up according to claim 1 wherein there is provided a cutting knife at the apex between the pick-up elements so as to cut the crop and allow the cut crop to pass to a selected one of the pick-up elements.

6. The pick-up according to claim 5 wherein each pick-up element includes a front roller and a rear roller and at least one endless belt arranged on the rollers and wherein the cutting knife comprises a plurality of cutting blades mounted on an end of the front roller of one of the pick-up elements for rotation therewith about a longitudinal axis of the roller.

7. The pick-up according to claim 6 wherein there is provided a crop guide member above the cutting knife and arranged to direct the crop into the cutting knife.

8. The pick-up according to claim 1 wherein there is provided a plurality of coulters each running on the ground in front of the pick-up elements including two outer coulters at outer ends of the pick-up elements and a central coulter at a position between the two pick-up elements and wherein the pick-up elements are supported on the coulters so as to be raised and lowered thereby in response to changes in ground height.

9. The pick-up according to claim 1 arranged for mounting on a front of a straight cut header having a header frame, a sickle knife across a front edge of the header frame for cutting a standing crop and a header table for receiving the cut crop wherein the pick-up frame includes a channel therein for receiving the sickle knife and a plurality of support arms for extending under the header table and wherein the collection surface extends over the header table.

10. The pick-up according to claim 9 wherein the pickup elements are mounted for said pivotal movement about an axis forwardly of said channel for said sickle knife.

11. A pick-up for harvesting a crop lying on the ground comprising:

a straight cut header having a header frame, mounting means for mounting the header frame for movement across the ground to be harvested with a width of the header frame transverse to the direction of movement, a sickle knife across a front edge of the header frame for cutting a standing crop, a header table for receiving the cut crop and a transport member for moving the crop in a direction across the header frame;

a pick-up frame mounted on a front of the header frame wherein the pick-up frame includes a receptacle therein receiving the sickle knife and a plurality of support arms extending under the header table and a collection surface extending across the width of the pick-up frame;

at least two pick-up elements mounted on the frame in side by side arrangement with each of the pick-up elements extending across only a part of the width of the frame;

each pick-up element having a front edge for engaging and lifting the lying crop onto the element and a rear edge for depositing the crop onto the collection surface on the pick-up frame for collection of the crop such that each pick-up element deposits the crop onto the collection surface of the pick-up frame and the collection surface is arranged such that the crop moves from the collection surface onto the header table and to the transport member;

and means mounting each of the pick-up elements on the pick-up frame for individual pivotal movement about an axis across the width of the frame such that a height of each pick-up element from the ground can be varied relative to the header frame.

12. The pick-up according to claim 11 wherein each pick-up element includes a front roller and a rear roller and a plurality of endless belts arranged in side by side relationship along the length of the rollers.

13. The pick-up according to claim 11 wherein there are provided two coulters each running on the ground in front of a respective one of the pick-up elements each at a respective outer end of the pick-up element and wherein the pick-up element is supported on the coulters so as to be raised and lowered thereby in response to changes in ground height.

14. The pick-up according to claim 11 wherein:

each pick-up element includes two end frames, a front roller and a rear roller parallel to the front roller and generally at right angles to the end frames;

each roller has bearing supports at opposed ends thereof for mounting the roller on the end frames for rotation about a longitudinal axis thereof;

there is provided a plurality of endless belts wrapped around the rollers and arranged in side to side relationship along the length of the rollers including end belts and at least one intermediate belt;

and there is provided spring biasing means mounted between the rollers in a plane joining the axes of the rollers and arranged to apply a spring force in a direction at right angles to the axes of the rollers so as to provide outward pressure on the rollers at an intermediate position thereon between the ends to tend to increase a distance between the rollers at the intermediate position so as to maintain the rollers parallel to reduce slipping of said at least one intermediate belt.

15. The pick-up according to claim 14 wherein there is provided a center tube between the rollers which is attached to the end frames.

16. The pick-up according to claim 15 wherein the spring biasing means is attached to the center tube and includes a first spring biasing element extending from the center tube to the front roller and a second spring biasing element extending from the center tube to the rear roller.

17. The pick-up according to claim 14 wherein the spring biasing means includes for each of the front and rear rollers a pair of wheels angularly spaced relative to the respective roller for rolling on an outer roller surface of the respective roller and locating the respective roller therebetween.

18. A pick-up for harvesting a crop lying on the ground comprising:

a pick-up frame;

mounting means for mounting the frame for movement across the ground to be harvested with a width of the frame transverse to the direction of movement;

at least one pick-up element mounted on the frame;

said at least one pick-up element having a front edge for engaging and lifting the lying crop onto the element and a rear edge for depositing the crop onto a collection surface on the frame for collection of the crop;

said at least one pick-up element including two end frames, a front roller and a rear roller parallel to the front roller and generally at right angles to the end frames;

each roller having bearing supports at opposed ends thereof for mounting the roller on the end frames for rotation about a longitudinal axis thereof;

a plurality of endless belts wrapped around the rollers and arranged in side to side relationship along the length of the rollers including end belts and at least one intermediate belt;

and spring biasing means mounted between the rollers in a plane joining the axes of the rollers and arranged to apply a spring force in a direction at right angles to the axes of the rollers so as to provide outward pressure on the rollers at an intermediate position thereon between the ends to tend to increase a distance between the rollers at the intermediate position so as to maintain the rollers parallel to reduce slipping of said at least one intermediate belt.

19. The pick-up according to claim 18 wherein there is provided a center tube between the rollers which is attached to the end frames.

20. The pick-up according to claim 19 wherein the spring biasing means is attached to the center tube and includes a first spring biasing element extending from the center tube to the front roller and a second spring biasing element extending from the center tube to the rear roller.

21. The pick-up according to claim 18 wherein the spring biasing means includes for each of the front and rear rollers a pair of wheels angularly spaced relative to the respective roller for rolling on an outer roller surface of the respective roller and locating the respective roller therebetween.

22. The pick-up according to claim 21 wherein the respective roller has a groove therein in which the wheels run.

* * * * *